(12) United States Patent
Cheng et al.

(10) Patent No.: US 9,116,556 B2
(45) Date of Patent: Aug. 25, 2015

(54) DUAL MODE MOUSE DEVICE

(75) Inventors: San Chi Cheng, Taipei Hsien (TW); Shu-I Chen, Taipei Hsien (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 721 days.

(21) Appl. No.: 13/350,702

(22) Filed: Jan. 13, 2012

(65) Prior Publication Data
US 2013/0002547 A1  Jan. 3, 2013

(30) Foreign Application Priority Data

Jun. 29, 2011 (TW) .............................. 100122729 A (51) Int. Cl.
*G06F 3/033* (2013.01)
*G06F 3/0354* (2013.01)

(52) U.S. Cl.
CPC .... G06F 3/03543 (2013.01); *G06F 2203/0332* (2013.01)

(58) Field of Classification Search
CPC ...................................................... G06F 3/033
USPC ......................................................... 345/158
See application file for complete search history.

(56) References Cited

U.S. PATENT DOCUMENTS

| | | | | |
|---|---|---|---|---|
| 4,319,488 A * | 3/1982 | Hobbs et al. | ................... | 73/509 |
| 4,780,707 A * | 10/1988 | Selker | ........................... | 345/163 |
| 5,805,143 A * | 9/1998 | Myers | ........................... | 345/163 |
| 6,031,522 A | 2/2000 | Strand | | |
| 6,714,188 B1 * | 3/2004 | Zebuhr et al. | ................. | 345/163 |
| 7,733,326 B1 * | 6/2010 | Adiseshan | ..................... | 345/156 |
| 7,924,266 B2 | 4/2011 | Larsen | | |
| 2004/0164962 A1 * | 8/2004 | Yin | ............................... | 345/163 |
| 2005/0116933 A1 * | 6/2005 | Huang et al. | .................. | 345/163 |
| 2009/0025568 A1 * | 1/2009 | Iwamoto | ......................... | 99/342 |
| 2010/0058896 A1 * | 3/2010 | Abel et al. | ........................ | 81/60 |
| 2012/0026091 A1 * | 2/2012 | Harper et al. | ................. | 345/163 |

FOREIGN PATENT DOCUMENTS

| | | |
|---|---|---|
| JP | 2003503788 A | 1/2003 |
| JP | 2005309685 A | 11/2005 |
| JP | 2008204328 A | 9/2008 |
| JP | 200993663 A | 4/2009 |
| TW | I228678 | 3/2005 |
| TW | I257567 | 7/2006 |
| TW | M400614 U1 | 3/2011 |

* cited by examiner

*Primary Examiner* — Quan-Zhen Wang
*Assistant Examiner* — David Lee
(74) *Attorney, Agent, or Firm* — Chun-Ming Shih (57) ABSTRACT

A point device is used with a computer device, and the point device includes a fixed base and a main body. The fixed base has a first hinge portion and a sensing displacement module, the first hinge portion locates on one end of the fixed base, and the sensing displacement module is electrically located in the fixed base to generate a displacement signal. Further, the main body includes a second hinge portion and a processing unit, and the second hinge portion locates on one end of the main body and pivoted on the first hinge portion. The main body and the fixed base are selectively rotated to a first angle or a second angle. Wherein, the processing unit is electrically located in the main body and is electrically connected to the sensing displacement module for receiving the displacement signal and transmitting the displacement signal to the computer device.

8 Claims, 9 Drawing Sheets

DUAL MODE MOUSE DEVICE

This application claims the benefit of the filing date of Taiwan Patent Application No. 100122729, filed on Jun. 29, 2011, in the Taiwan Intellectual Property Office, the disclosure of which is incorporated herein in its entirety by reference.

BACKGROUND OF THE INVENTION

1. Field of the Invention

The present invention relates to a pointing device, and more particularly relates to a pointing device that could depend on the different requirements of users to change to a mouse-operating mode or a holding-a-pen-operating mode.

2. Background of the Invention

A pointing device such as a mouse device is commonly used, and the pointing device is an essential input device for the computer system of nowadays. Therefore, almost all users would use the mouse device configured to input instructions and operate the computer system. In order to make the users utilize the mouse device comfortably, so that the manufacturers are improving its functions, appearance and flexibility. For example, the displacement of the cursor which displayed on the computer screen is operated by sensing module of the mouse device that has replaced the trackball of the mouse device in early periods. Furthermore, a roller wheel is disposed between the two buttons of the mouse device, so as to obtain superior convenience while the users using the mouse device.

However, the use of the mouse device at present that is the user puts its palm placing onto the surface of the mouse device and configured to be hold the whole mouse device, such the above-mentioned using manner that causes the muscles and joints of the users' hand easily tired after a long time. Moreover, the forgoing using manner that also causes the injury with the user's wrist or hand due to the user's wrist lacks the point of application during the long time.

Nevertheless, the existing mouse device has evolved with ergonomics, or the mouse device is known has evolved with the holding-pen using manner, so as to retard the tiredness of the users' hand. However, the user uses the forgoing mouse device who still maintains the same posture during operation, which causes the problem as injury with the user's wrist and hand yet.

SUMMARY OF THE INVENTION

In view of the forgoing problems, the present invention is directed to a pointing device for solving the problems of the prior art with tiredness of the users' hand, even injury with the user's wrist due to the user who maintains the same posture during use the existing mouse device after the long time.

The present invention discloses a pointing device which used with a computer device, and the pointing device includes a fixed base and a main body which is selectively rotated to a first angle or a second angle. The fixed base of the pointing device includes a first hinge portion and a sensing displacement module, the first hinge portion is located on one end of the fixed base, and the sensing displacement module is electrically located in the fixed base to generate a displacement signal.

Further, according to the present invention, the main body of the pointing device includes a second hinge portion and a processing unit, the second hinge portion is located on one end of the main body and pivots on the first hinge portion, and the processing unit is electrically located in the main body and is electrically connected to the sensing displacement module for receiving the displacement signal and transmitting the displacement signal to the computer device.

The pointing device of the present invention further includes an outer covering, wherein the outer covering has an accommodating space for holding the fixed base and the main body in the outer covering.

The effectiveness of the present invention is that users can able to pivot the fixed base and main body of the pointing device to a first angle or a second angle depending on the users' requirement, so as to change the operating manner of the pointing device. Therefore, the invention effectively avoid the user who maintains the same posture during a long time, so as to protect the users' hand would not injure, even causing sport injury with the user's wrist.

The characteristics, realization and functions of the present invention are disclosed in the following description with reference to the preferred exemplified embodiments and the accompanying drawings.

DETAILED DESCRIPTION OF THE INVENTION

Figure 1:
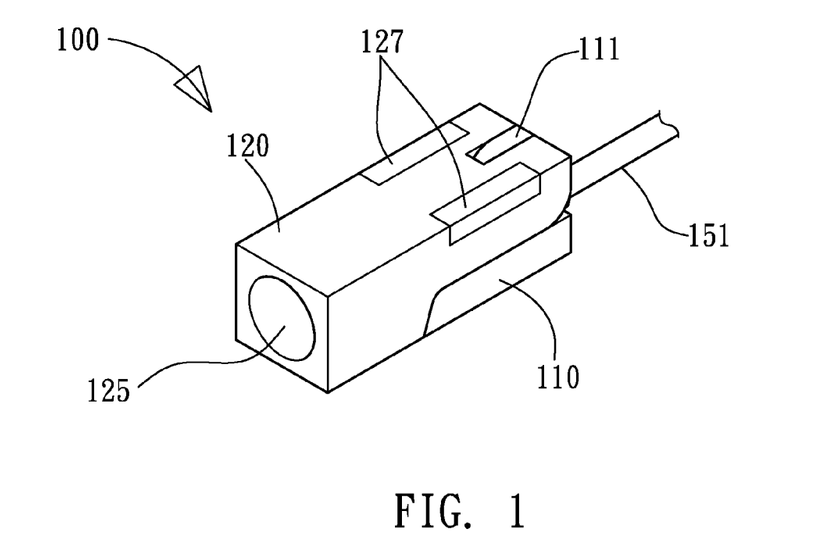
FIG. 1 is the front view of the three-dimensional diagram of the first embodiment of the present invention.
Figure 2:
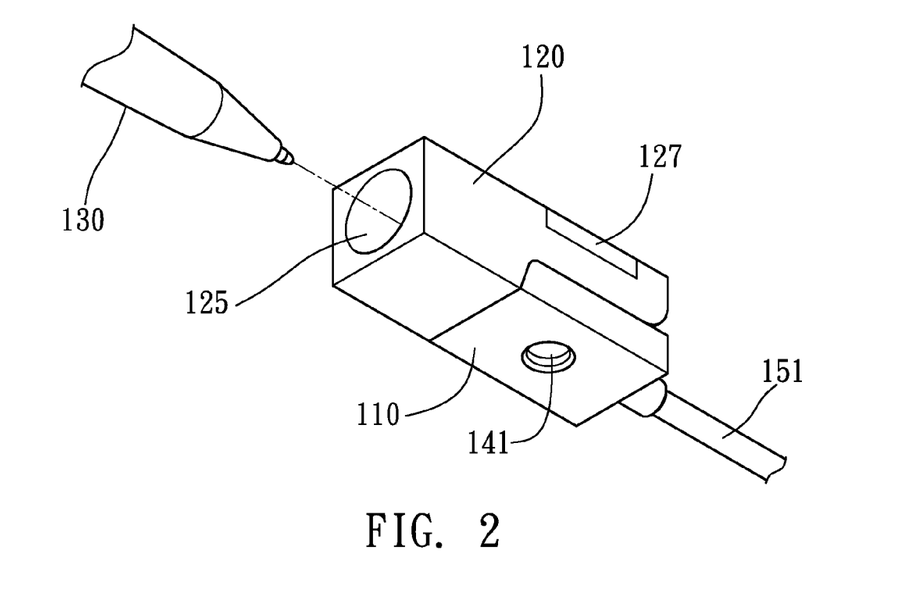
FIG. 2 is the rear view of the three-dimensional diagram of the first embodiment of the present invention.
Figure 3:
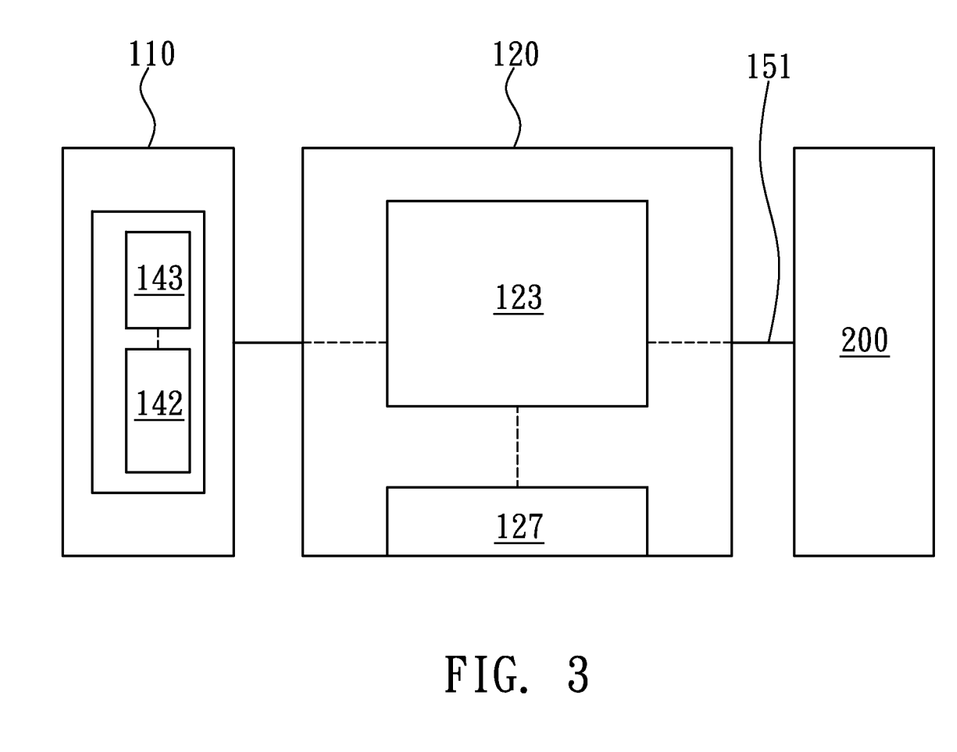
FIG. 3 is the circuit block diagram of the first embodiment of the present invention.

FIG. 1 and FIG. 2 respectively shows the front view and the rear view of three-dimensional diagrams of the first embodiment of the present invention, and FIG. 3 shows the circuit block diagram of the first embodiment of the present invention.

In the first embodiment, a pointing device 100 includes a fixed base 110 and a main body 120. In particular, one end of the fixed base 110 has a first hinge portion 111, and one end of the main body 120 has a second hinge portion 121. Further, the fixed base 110 and the main body 120 pivot each other by the first hinge portion 111 and the second hinge portion 121. A sensing displacement module 140 is electrically mounted in the fixed base 110, and the sensing displacement module 140 further includes a light source 143 and a light sensor 145, and additionally, the fixed base 110 has a through hole 141. Thus, the light source 143 radiates a sensing light penetrating the through hole 141, and the light sensor 145 receives the reflective light of the sensing light to generate a displacement signal. However, a person skilled in the art can generate a displacement signal by utilizing various sensing displacement technologies according to his/her experience or design requirements, those technologies are not limited in the disclosed embodiment.

The main body 120 has a processing unit 123, and the sensing displacement module 140 is electrically connected to the processing unit 120, such that the processing unit 123 receives the displacement signal generated from the sensing displacement module 140. Besides, the main body 120 has two buttons 127 which are electrically connected to the processing unit 123 for input control. However, a person skilled in the art can rely on his/her specific requirements and selectively change amount or structure of the button, and those technologies are not limited in the disclosed embodiment.

The pointing device 100 of the first embodiment further includes a connecting wire 151, and the connecting wire 151 is electrically connected to the pointing device 100 with a computer device 200. Therefore, the processing unit 123 can transfer the displacement signal to the computer device 200 by the connecting wire 151, and users can operate the computer device 200 by the pointing device 100 of the first embodiment. However, the communication between the pointing device 100 and the computer device 200 can also be conducted by cordless manner, so called wireless, such as Bluetooth, satellite etc.

Another end of the main body 120 further has a hole 125, and the pointing device 100 of the first embodiment further includes a holding element 130 which could plug into the hole 125, and the holding element 130 could be a pen in the disclosed embodiment. The bore diameter of the hole 125 can be designed substantially same as the rod diameter of the pencil or pen on the market, therefore users could plug a pen, which is carried along by the users into the hole 125. Advantageously, it is convenient for user to hold the pointing device 100. However, the holding element 130 is not limited to a pen, it can be an object which is designed, shaped or manufactured for users to hold.

Figure 4A:
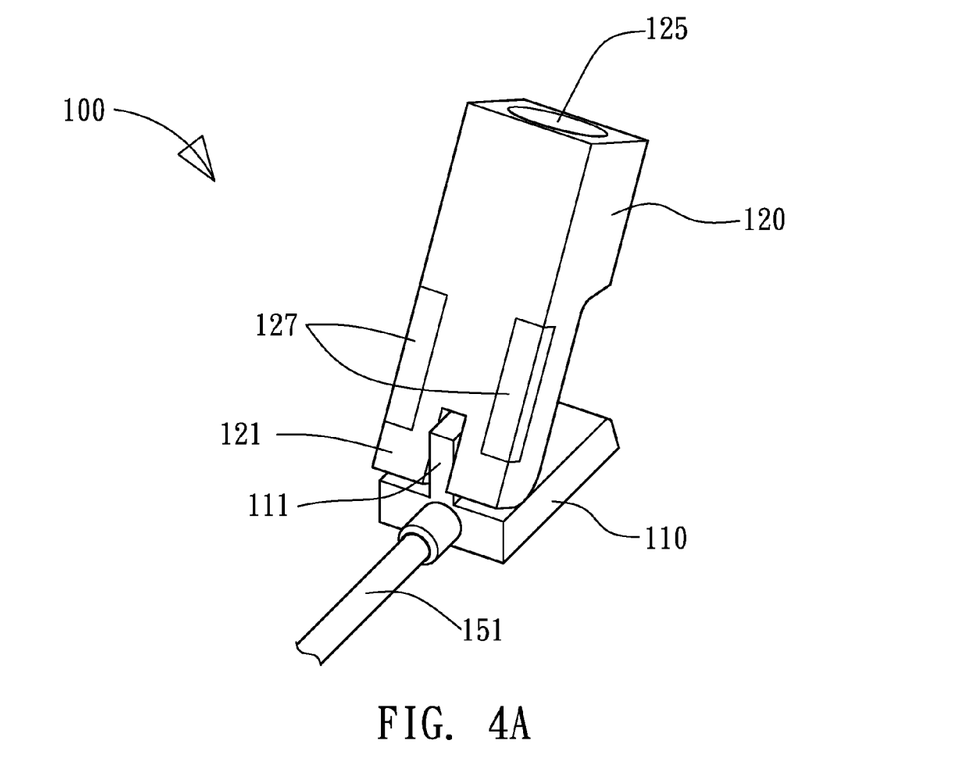
FIG. 4A is the front view of the three-dimensional diagram of the holding-a-pen-operating mode of the first embodiment of the present invention.
Figure 4B:
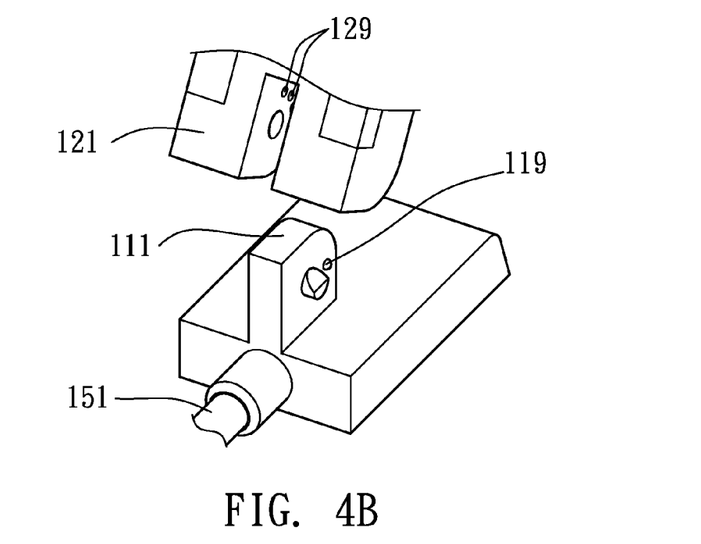
FIG. 4B is the enlarged exploded view of the first hinge portion and the second hinge portion of the first embodiment of the present invention.

Subsequently, FIG. 4A and FIG. 5 respectively shows the front view of the three-dimensional diagram and the lateral view of the holding-a-pen-operating module of the first embodiment. FIG. 4B is the enlarged exploded view to illustrate the connection of the first hinge portion 111 and the second hinge portion 121 in the FIG. 4A.

Due to the fixed base 110 and main body 120 are pivoted by the first hinge portion 111 and the second hinge portion 121, the main body 120 can rotate from the fixed base 110 and form an angle between the main body 120 and the fixed base 110. In the disclosed embodiment, when the fixed base 110 and the main body 120 rotate to a second angle 170, so called "holding-a-pen-operating angle", the pointing device 100 is at a holding-a-pen-operating mode, so called "holding-a-pen-operating (HAPO) mode" means users could hold the main body 120 as holding a pen to operate the pointing device 100.

Furthermore, the first hinge portion 111 includes a protrusion 119, and the second hinge portion 121 includes at least one location holes 129, wherein the protrusion 119 could be inserted into one of the location holes 129 for keeping the main body 120 at the second angle (holding-a-pen-operating angle) 170 (as shown in FIG. 4B). The purpose of setting multiple location holes 129 is to give users different option to choose location holes 129 in order to fix the main body 120 and the fixed base 110 depending on the second angle 170.

However, a person skilled in the art can rely on his/her specific requirements and selectively use at least one protrusion 119 and a corresponding location hole 129. Alternatively, a person skilled in the art can rely on his/her specific requirements and selectively use multiple protrusions 119 and multiple location holes 129. Even further, a person skilled in the art can rely on his/her specific requirements and selectively use only a single protrusion 119 and a single location hole 129. The above-mentioned combinations are used to illustrate the effectiveness of fixing the main body 120 and the fixed base 110 but the disclosure is not limiting in these.

In the disclosed embodiment, when the fixed base 110 and the main body 120 are parallel to each other, the pointing device 100 is at a mouse-operating mode. The main body 120 further has a recess 150, whereby as the size of the fixed base 110 is smaller than the size of the main body 120, and the fixed base 110 is embedded in the recess 150, as shown in FIG. 6 which is the lateral view of the mouse-operating mode of the first embodiment.

Figure 5:
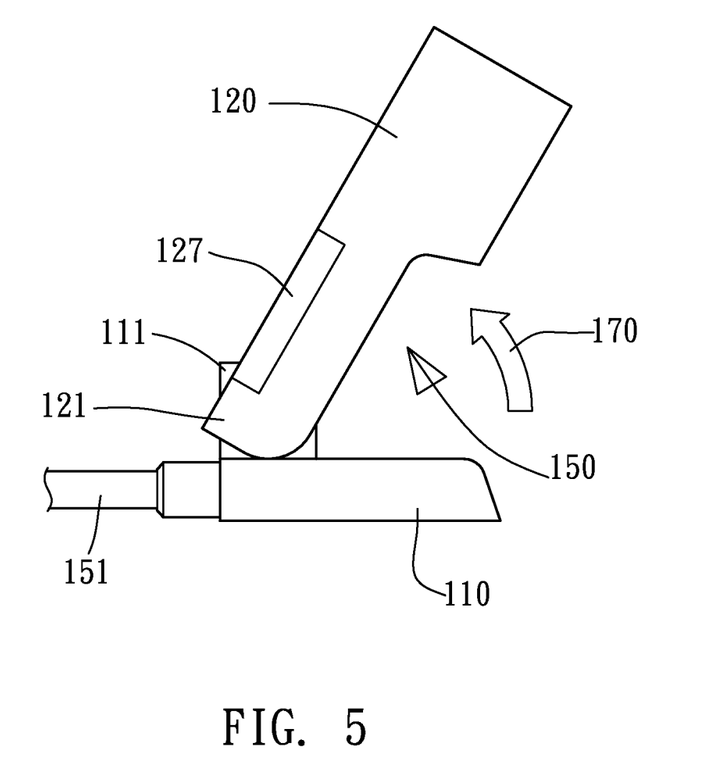
FIG. 5 is the lateral view of the holding-a-pen-operating mode of the first embodiment of the present invention.
Figure 6:
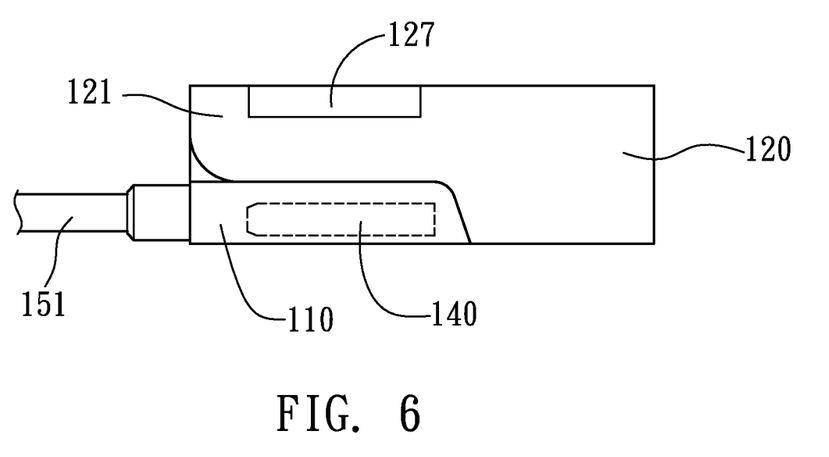
FIG. 6 is the lateral view of the mouse-operating mode of the first embodiment of the present invention.

Therefore, the forgoing pointing device 100 of the invention make users depending on their requirements to rotate the fixed base 110 and main body 120 to the second angle (holding-a-pen-operating angle) 170 (as shown in FIG. 5) or the first angle (mouse-operating angle) (as shown in FIG. 6) for changing the operating modes of the pointing device 100 according to their requirements. Thus, users don't need to maintain the same posture in a long time to operate the pointing device 100, and effectively avoid tiredness of the users' hand, even avoid ergonomic injury.

Figure 7:
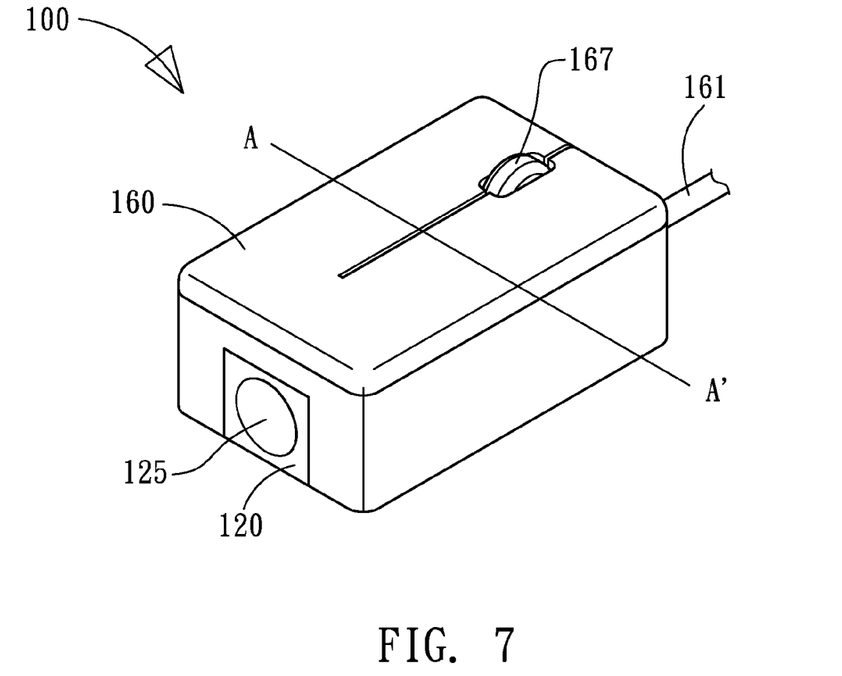
FIG. 7 is the front view of the three-dimensional diagram of the second embodiment of the present invention.
Figure 8:
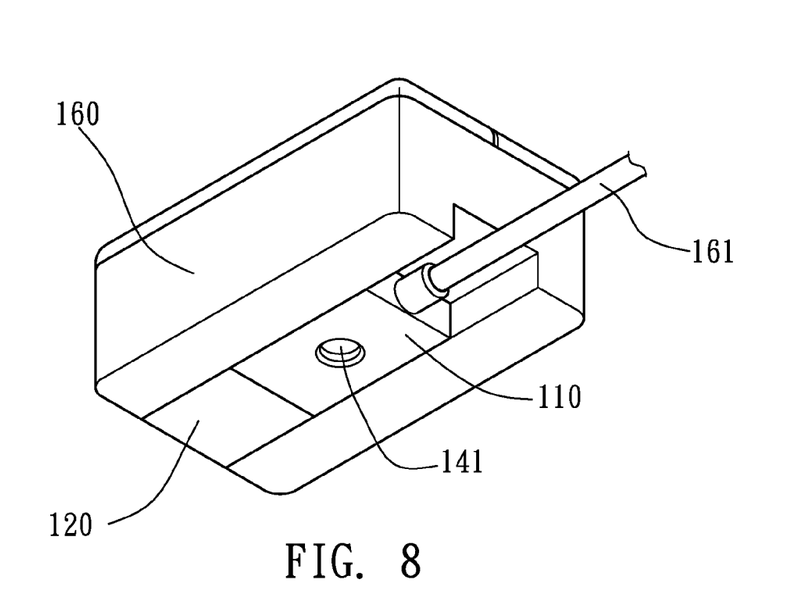
FIG. 8 is the rear view of the three-dimensional diagram of the second embodiment of the present invention.
Figure 9:
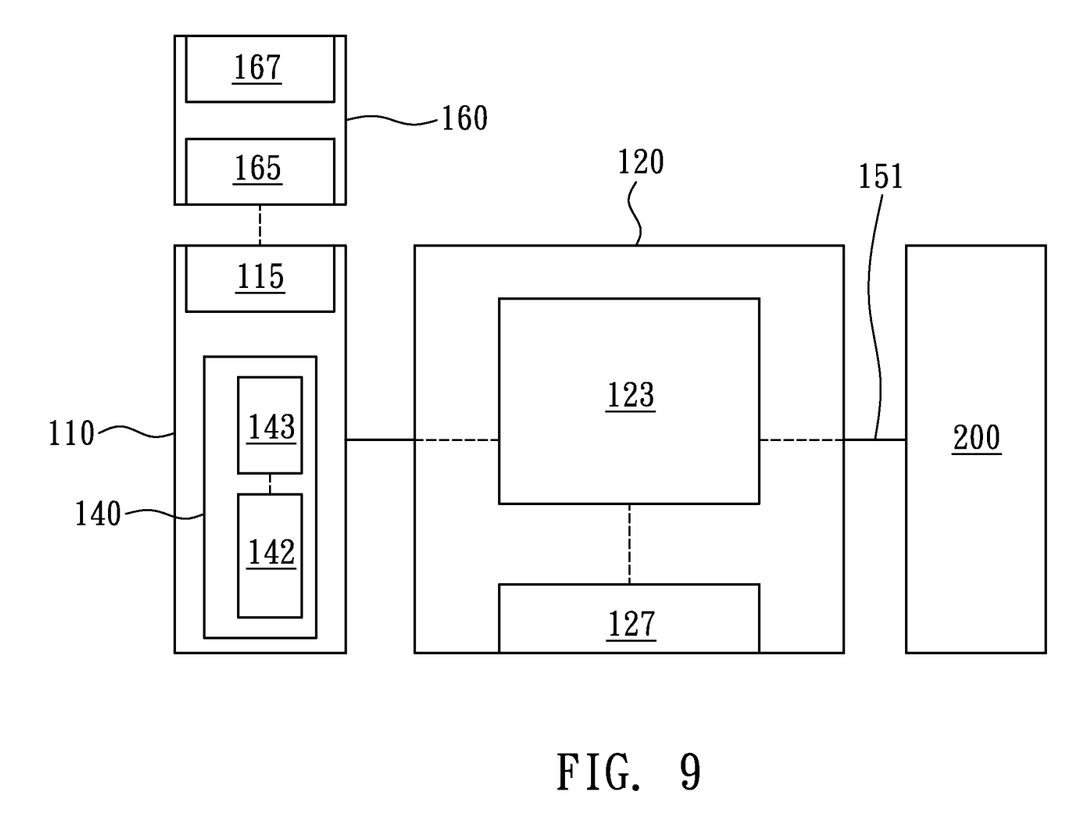
FIG. 9 is the circuit block diagram of the second embodiment of the present invention.

FIG. 7 and FIG. 8 respectively shows the front view and the rear view of the three-dimensional diagrams of the second embodiment, and FIG. 9 shows the circuit block diagram of the second embodiment.

A pointing device 100' of the second embodiment includes a fixed base 110, a main body 120 and an outer covering 160, wherein the detailed features and the related connection of the fixed base 110 and main body 120 are approximately similar to the pointing device 100 disclosed in the first embodiment. Thus, the similar features do not describe again here, and the similar elements use the same reference signs to show for clearing the description.

Figure 10:
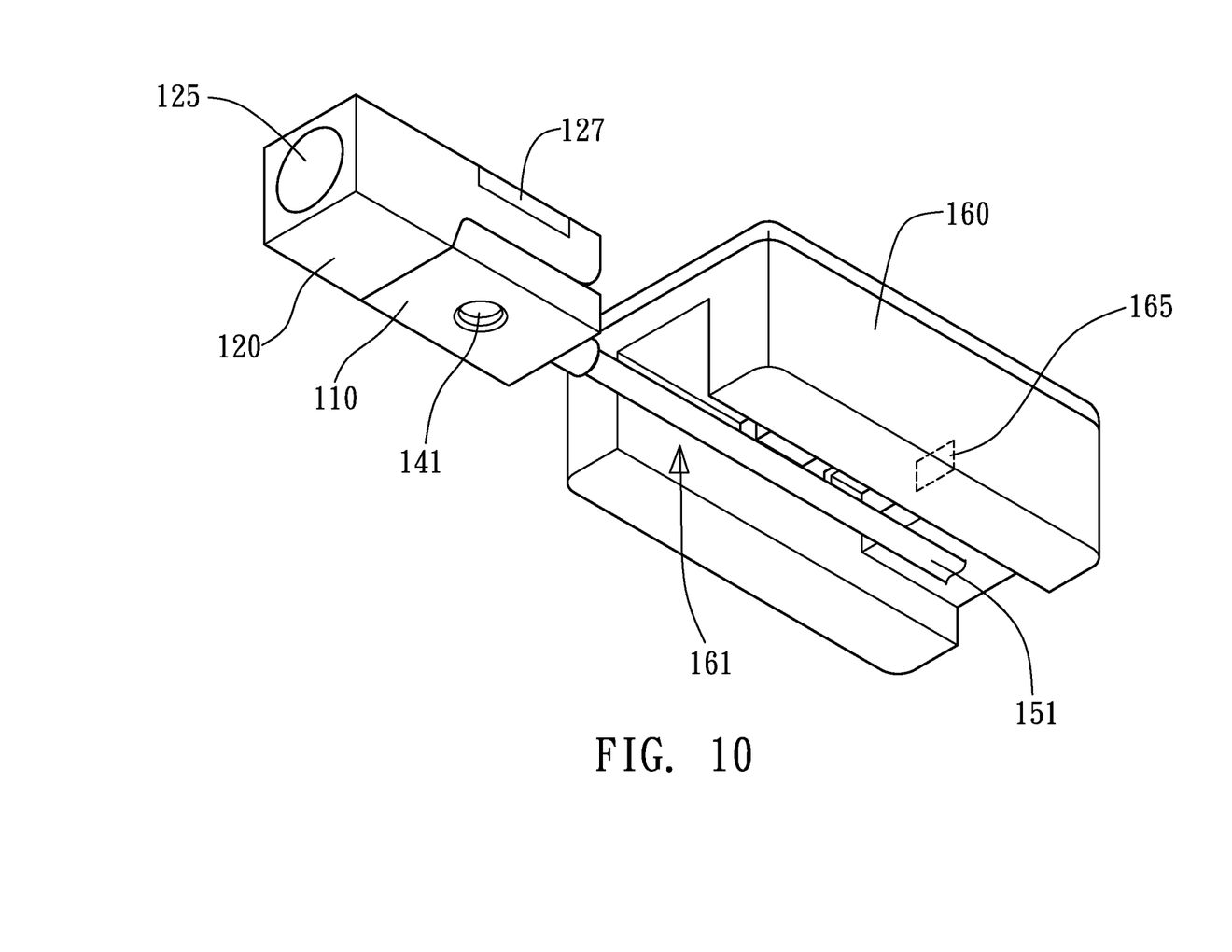
FIG. 10 is the front view of the three-dimensional diagram of the combination with an outer covering in the second embodiment of the present invention.
Figure 11:
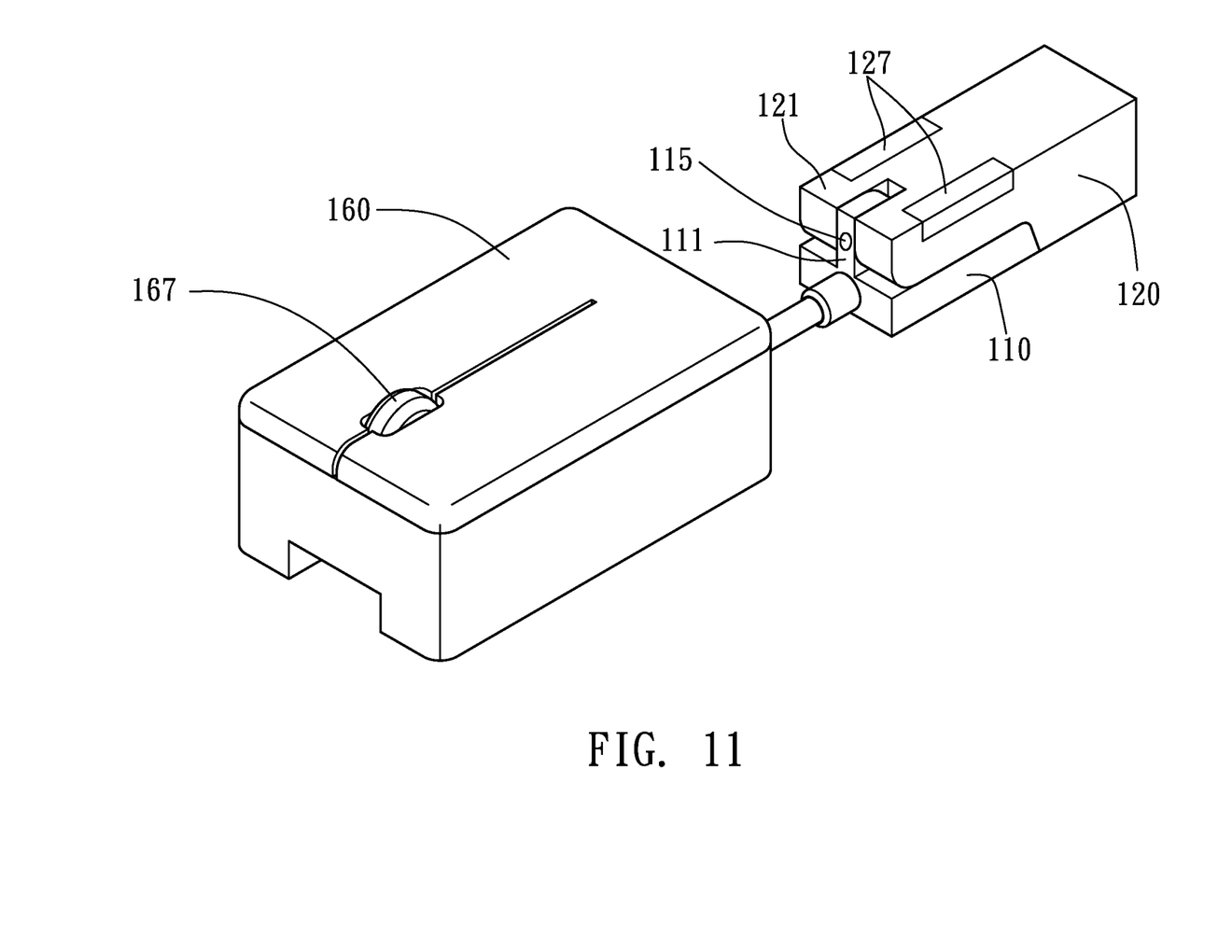
FIG. 11 is the rear view of the three-dimensional diagram of the combination with the outer covering in the second embodiment of the present invention.

Subsequently, FIG. 10 and FIG. 11 respectively shows the front view and a rear view of the three-dimensional diagrams of the combination with an outer covering 160 in the second embodiment. The outer covering 160 has an accommodating space 161, further the fixed base 110 and the main body 120 could be disposed to the accommodating space 161 for holding in the outer covering 160. In the disclosed embodiment, whereby the size of the accommodating space 161 is substantially same as the size of the fixed base 110 and the main body 120 at the mouse-operating mode, and the fixed 110 and the main body 120 could be disposed in the forgoing accommodating space 161.

The outer covering 160 further includes a roller 167 and a first connection port 165. In this disclosed embodiment, and the fixed base 110 further has a second connecting port 115, and the second connecting port 115 is electrically connected to the processing unit 123. Therefore, when the fixed base 110 and the main body 120 set in the accommodating space 161 of the outer covering 160, the first connecting port 165 and the second connecting port 115 are couple to each other as the effect as the first connecting port 165 electrically connect to the processing unit 123, wherein the roller 167 electrically connects to the first connecting port 165. Thus, the roller 167 is selectively triggered to generate a scrolling signal, and the scrolling signal is transferred to the processing unit 123 by the first connecting port 165 and the second connecting port 115.

Therefore, the scrolling signal generated from the roller 167 of the outer covering 160 by users can be transferred to the processing unit 123 then transferred to the computer device 200 by the connecting wire 151.

Figure 12:
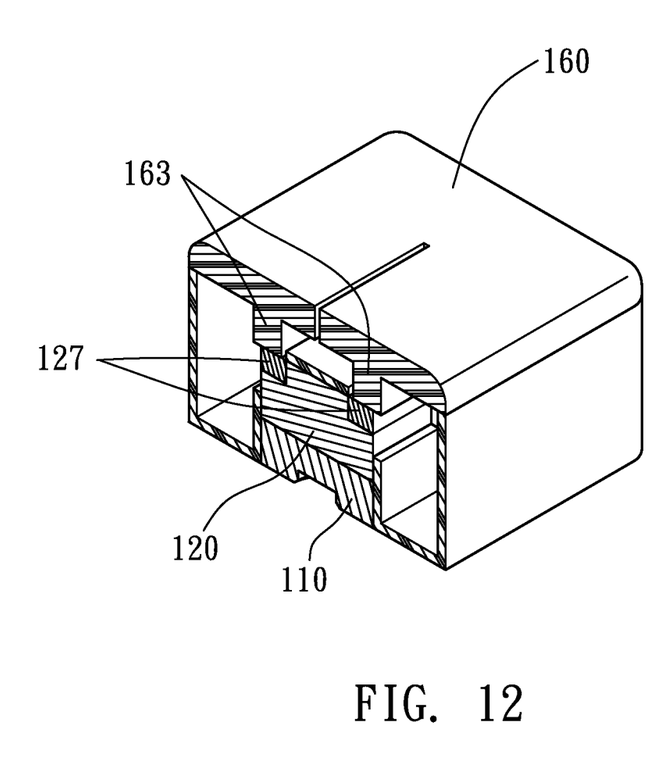
FIG. 12 is the cross-section view of A-A' of the second embodiment of the present invention shown in FIG. 7.

FIG. 12 shows the cross-section view of A-A' of the second embodiment shown in FIG. 7. The outer covering 160 further includes two pressing portions 163, and the two pressing portions 163 are corresponding to the two buttons 127 of the main body 120 respectively. Thus, at least one pressing portions 163 is selectively pressed to push the corresponding button 127 that is electrically connected to the processing unit 123, this operating signal can be transferred to the computer device 200 by the processing unit 123.

In this disclosed embodiment, the two pressing portions 163 are located corresponding above the two buttons 127 by mechanical manners. When users press one of the pressing portions 163, the pressing portions pushes the corresponding button 127, as the effects as the users press the button 127 directly. A person skilled in the art can rely on his/her specific requirements and selectively change amount or structure of the button, and those technologies are not limited in the disclosed embodiment.

Therefore, users can be used the pointing device 100' disclosed in the second embodiment. At the mouse-operating mode, that assemble the outer covering 160 for adding the holding surface to match the ergonomics, so that the users can be used the roller 167 of the outer covering 160 to operate the pointing device 100'. Advantageously, it is convenient for user to use the pointing device 100'. It needs to explain that although the outer covering 160 shows as square shape in the disclosed embodiment, a person skilled in the art can change an arc shape by utilizing various outer shape designs according to ergonomics, his/her experience or design requirements, those technologies are not limited in the disclosed embodiment.

The present invention has been disclosed as mentioned-above and it is understood the embodiments are not intended to limit the scope of the present invention. Moreover, as the contents disclosed herein should be readily understood and can be implemented by a person skilled in the art, all equivalent changes or modifications which do not depart from the spirit of the present invention should be encompassed by the appended claims.

What is claimed is:

1. A dual mode mouse device, used with a computer device, comprising:
   a fixed base comprising a first hinge portion, a through hole and a sensing displacement module, the first hinge portion located on one end of the fixed base, and the sensing displacement module located in the fixed base and comprising a light source and a light sensor, wherein the light source radiates a sensing light penetrating the through hole of the fixed base and the light sensor receives the reflective light of the sensing light to detect displacement of the fixed base and generate a displacement signal; and
   a main body comprising a second hinge portion and a processing unit, the second hinge portion located on one end of the main body and pivoted on the first hinge portion, and the processing unit located in the main body and electrically connected to the sensing displacement module for receiving the displacement signal and transmitting the displacement signal to the computer device;
   wherein the main body and the fixed base is selectively rotated to a first angle or a second angle, wherein said sensing displacement module of said fixed base is capable of detecting displacement of the fixed base at both said first angle and said second angle.

2. A dual mode mouse device as in claim 1, further comprising a holding element, and the main body further comprising a hole located on another end of the main body, and the holding element plugging into the hole.

3. A dual mode mouse device as in claim 1, wherein the main body further comprises two buttons and the two buttons being electrically connected to the processing unit.

4. A dual mode mouse device as in claim 3, further comprising an outer covering, and the outer covering comprising an accommodating space for holding the fixed base and the main body in the outer covering.

5. A dual mode mouse device as in claim 4, wherein the outer covering further comprises two pressing portions corresponding to the two buttons respectively, and at least one of the pressing portions being selectively pressed to push the corresponding button.

6. A dual mode mouse device as in claim 4, wherein the outer covering further comprises a roller and a first connecting port, and the fixed base comprises a second connecting port being electrically connected to the processing unit; as the fixed base is disposed in the outer covering and the first connecting port and the second connecting port are coupled together, the roller is selectively triggered to generate a scrolling signal, and the scrolling signal is transferred to the processing unit by the first connecting port and the second connecting port.

7. A dual mode mouse device as in claim 1, wherein the first hinge portion further comprises at least one protrusion and the second hinge portion further comprises at least one location hole, and the protrusion is inserted into the location hole for fixing and keeping the main body and the fixed base at the second angle.

8. A dual mode mouse device as in claim 1, wherein the main body further comprises a recess, while the main body is rotated to the first angle, the fixed base is embedded in the recess.

* * * * *